US012759705B2

(12) United States Patent
Meyer et al.

(10) Patent No.: US 12,759,705 B2
(45) Date of Patent: Oct. 13, 2026

(54) EXTENDING CARGO RESTRAINT ASSEMBLY

(71) Applicant: Goodrich Corporation, Charlotte, NC (US)

(72) Inventors: Zachary Meyer, Bismarck, ND (US); Jacob Leroy Limke, Jamestown, ND (US)

(73) Assignee: Goodrich Corporation, Charlotte, NC (US)

( * ) Notice: Subject to any disclaimer, the term of this patent is extended or adjusted under 35 U.S.C. 154(b) by 363 days.

(21) Appl. No.: 18/467,099

(22) Filed: Sep. 14, 2023

(65) Prior Publication Data

US 2025/0091727 A1 Mar. 20, 2025

(51) Int. Cl.

| | |
|---|---|
| ***B64D 9/00*** | (2006.01) |
| ***B60P 7/13*** | (2006.01) |
| ***B61D 45/00*** | (2006.01) |
| ***B63B 25/28*** | (2006.01) |
| ***B64F 1/32*** | (2006.01) |

(52) U.S. Cl.

CPC ................ *B64D 9/003* (2013.01); *B60P 7/13* (2013.01); *B61D 45/007* (2013.01); *B64F 1/32* (2013.01); *B63B 2025/285* (2013.01)

(58) Field of Classification Search

CPC ..... B60P 7/13; B64D 9/003; B63B 2025/285; B61D 45/007

See application file for complete search history.

(56) References Cited

U.S. PATENT DOCUMENTS 5,000,635 A 3/1991 Jensen et al.
5,564,654 A * 10/1996 Nordstrom ............. B64D 9/003 248/500

* cited by examiner

*Primary Examiner* — Nicholas McFall

(74) *Attorney, Agent, or Firm* — SNELL & WILMER L.L.P.

(57) ABSTRACT

An extending cargo restraint assembly for a cargo handling system mobile is provided. The extending cargo restraint assembly includes a base assembly, The base assembly includes a primary plunger and a secondary plunger. Responsive to be activated, the primary plunger is configured to extend in a first direction into an opening within a modular container thereby restraining the modular container in a second direction, the second direction being perpendicular to the first direction. Responsive to being activated, the secondary plunger is configured to extend in the second direction within the opening of the modular container thereby further restraining the modular container in the second direction.

18 Claims, 14 Drawing Sheets

EXTENDING CARGO RESTRAINT ASSEMBLY

GOVERNMENT LICENSE RIGHTS

This invention was made with Government support under SPE8EJ-20-D-0012, SPE8EL-20-F-1FT1 awarded by the United States Navy. The Government has certain rights in this invention.

FIELD

The present disclosure generally relates to the field of cargo handling systems and, more particularly, to an extending cargo restraint assembly for cargo compartment of an aircraft.

BACKGROUND

Aircrafts configurable for transportation of cargo, i.e. palletized or containerized cargo, rely on adequate spacing of pallets or containers to be maintained to avoid inadvertent contact or load transfer between pallets or containers during flight. Typically, the cargo hold layout is variable enough to allow for pallets or containers to be appropriately spaced to ensure no contact is made. However, in some scenarios, spacing may need to be reduced for various reasons to the degree that, with tolerancing considered, pallets or containers may contact each other during ground handling or in-flight.

SUMMARY

An extending cargo restraint assembly for a cargo handling system is disclosed. The extending cargo restraint assembly includes a base assembly. The base assembly includes a primary plunger and a secondary plunger. Responsive to being activated, the primary plunger is configured to extend in a first direction into an opening within a modular container thereby restraining the modular container in a second direction, the second direction being perpendicular to the first direction. Responsive to being activated, the secondary plunger is configured to extend in the second direction within the opening of the modular container thereby further restraining the modular container in the second direction.

In various embodiments, the secondary plunger is positioned within an internal chamber of the primary plunger. In various embodiments, the base assembly further includes an actuation lever. In various embodiments, the actuation lever is coupled to the base assembly via a coupling pin and is configured to rotate about axis through a longitudinal center of the coupling pin. In various embodiments, the actuation lever is further coupled to the primary plunger and the secondary plunger. In various embodiments, the actuation lever includes a linkage connector end. In various embodiments, the linkage connector end is mechanically and rotatably coupled to the primary plunger via a set of intermediate linkages. In various embodiments, responsive to the actuation lever being depressed in a vertical direction, the linkage connector end moves substantially in the first direction thereby forcing the set of intermediate linkages to move substantially in the first direction extending the primary plunger in the first direction into the opening within the modular container. In various embodiments, a mechanical and rotatable coupling between the linkage connector end and the set of intermediate linkages is configured to move over a center line established between a coupling of the set of intermediate linkages to the primary plunger and the coupling pin thereby providing an over-center locking mechanism that locks the primary plunger at an outermost extension in the first direction from the base assembly into the opening within the modular container.

In various embodiments, the actuation lever includes an activation end. In various embodiments, the activation end is mechanically and rotatably coupled to the secondary plunger via a first set of secondary plunger linkages, a secondary plunger rod, and a second set of secondary plunger linkages. In various embodiments, responsive to the actuation lever being depressed in a vertical direction, a first end of the first set of secondary plunger linkages is configured to move in a downward direction thereby forcing a second end of the first set of secondary plunger linkages to move in the first direction. In various embodiments, responsive to the second end of the first set of secondary plunger linkages moving in the first direction, the secondary plunger rod is configured to move in the first direction thereby forcing a first end of the second set of secondary plunger linkages to move in the first direction. In various embodiments, responsive to the first end of the second set of secondary plunger linkages moving in the first direction, the second end of the second set of secondary plunger linkages is configured to move in the second direction thereby forcing the secondary plunger to extend outwardly from the primary plunger in the second direction.

In various embodiments, a mechanical and rotatable coupling between a distal end of the secondary plunger rod and the first end of the second set of secondary plunger linkages is configured to move over a center line established between a middle of the secondary plunger in the first direction and a coupling of the second end of the second set of secondary plunger linkages to the secondary plunger thereby providing an over-center locking mechanism that locks the secondary plunger at an outermost extension in the second direction from the primary plunger within the opening of the modular container. In various embodiments, the extending cargo restraint assembly further includes a set of anchors integrated into the extending cargo restraint assembly. In various embodiments, the set of anchors couple the extending cargo restraint assembly to a cargo deck of a cargo compartment.

Also disclosed herein is a cargo handling system, The cargo handling system includes a plurality of extending cargo restraint assemblies. Each extending cargo restraint assembly of the plurality of extending cargo restraint assemblies includes a base assembly, The base assembly includes a primary plunger and a secondary plunger. Responsive to being activated, the primary plunger is configured to extend in a first direction into an opening within a modular container thereby restraining the modular container in a second direction, the second direction being perpendicular to the first direction. Responsive to being activated, the secondary plunger is configured to extend in the second direction within the opening of the modular container thereby further restraining the modular container in the second direction.

In various embodiments, the base assembly further includes an actuation lever. In various embodiments, the actuation lever is coupled to the base assembly via a coupling pin and is configured to rotate about axis through a longitudinal center of the coupling pin. In various embodiments, the actuation lever is further coupled to the primary plunger and the secondary plunger. In various embodiments, the actuation lever includes a linkage connector end. In various embodiments, the linkage connector end is mechanically and rotatably coupled to the primary plunger via a set of intermediate linkages. In various embodiments, responsive to the actuation lever being depressed in a vertical direction, the linkage connector end moves substantially in the first direction thereby forcing the set of intermediate linkages to move substantially in the first direction extending the primary plunger in the first direction into the opening within the modular container. In various embodiments, a mechanical and rotatable coupling between the linkage connector end and the set of intermediate linkages is configured to move over a center line established between a coupling of the set of intermediate linkages to the primary plunger and the coupling pin thereby providing an over-center locking mechanism that locks the primary plunger at an outermost extension in the first direction from the base assembly into the opening within the modular container.

In various embodiments, the actuation lever includes an activation end. In various embodiments, the activation end is mechanically and rotatably coupled to the secondary plunger via a first set of secondary plunger linkages, a secondary plunger rod, and a second set of secondary plunger linkages. In various embodiments, responsive to the actuation lever being depressed in a vertical direction, a first end of the first set of secondary plunger linkages is configured to move in a downward direction thereby forcing a second end of the first set of secondary plunger linkages to move in the first direction. In various embodiments, responsive to the second end of the first set of secondary plunger linkages moving in the first direction, the secondary plunger rod is configured to move in the first direction thereby forcing a first end of the second set of secondary plunger linkages to move in the first direction. In various embodiments, responsive to the first end of the second set of secondary plunger linkages moving in the first direction, the second end of the second set of secondary plunger linkages is configured to move in the second direction thereby forcing the secondary plunger to extend outwardly from the primary plunger in the second direction.

In various embodiments, a mechanical and rotatable coupling between a distal end of the secondary plunger rod and the first end of the second set of secondary plunger linkages is configured to move over a center line established between a middle of the secondary plunger in the first direction and a coupling of the second end of the second set of secondary plunger linkages to the secondary plunger thereby providing an over-center locking mechanism that locks the secondary plunger at an outermost extension in the second direction from the primary plunger within the opening of the modular container.

Additionally disclosed herein is an aircraft. The aircraft includes a cargo deck and a cargo handling system disposed on the cargo deck. The cargo handling system includes a plurality of extending cargo restraint assemblies. Each extending cargo restraint assembly of the plurality of extending cargo restraint assemblies includes a base assembly. The base assembly includes a primary plunger and a secondary plunger. Responsive to being activated, the primary plunger is configured to extend in a first direction into an opening within a modular container thereby restraining the modular container in a second direction, the second direction being perpendicular to the first direction. Responsive to being activated, the secondary plunger is configured to extend in the second direction within the opening of the modular container thereby further restraining the modular container in the second direction.

In various embodiments, the base assembly further includes an actuation lever. In various embodiments, the actuation lever is coupled to the base assembly via a coupling pin and is configured to rotate about axis through a longitudinal center of the coupling pin. In various embodiments, the actuation lever is further coupled to the primary plunger and the secondary plunger. In various embodiments, the actuation lever includes a linkage connector end. In various embodiments, the linkage connector end is mechanically and rotatably coupled to the primary plunger via a set of intermediate linkages. In various embodiments, responsive to the actuation lever being depressed in a vertical direction, the linkage connector end moves substantially in the first direction thereby forcing the set of intermediate linkages to move substantially in the first direction extending the primary plunger in the first direction into the opening within the modular container. In various embodiments, a mechanical and rotatable coupling between the linkage connector end and the set of intermediate linkages is configured to move over a center line established between a coupling of the set of intermediate linkages to the primary plunger and the coupling pin thereby providing an over-center locking mechanism that locks the primary plunger at an outermost extension in the first direction from the base assembly into the opening within the modular container.

In various embodiments, the actuation lever includes an activation end. In various embodiments, the activation end is mechanically and rotatably coupled to the secondary plunger via a first set of secondary plunger linkages, a secondary plunger rod, and a second set of secondary plunger linkages. In various embodiments, responsive to the actuation lever being depressed in a vertical direction, a first end of the first set of secondary plunger linkages is configured to move in a downward direction thereby forcing a second end of the first set of secondary plunger linkages to move in the first direction. In various embodiments, responsive to the second end of the first set of secondary plunger linkages moving in the first direction, the secondary plunger rod is configured to move in the first direction thereby forcing a first end of the second set of secondary plunger linkages to move in the first direction. In various embodiments, responsive to the first end of the second set of secondary plunger linkages moving in the first direction, the second end of the second set of secondary plunger linkages is configured to move in the second direction thereby forcing the secondary plunger to extend outwardly from the primary plunger in the second direction.

In various embodiments, a mechanical and rotatable coupling between a distal end of the secondary plunger rod and the first end of the second set of secondary plunger linkages is configured to move over a center line established between a middle of the secondary plunger in the first direction and a coupling of the second end of the second set of secondary plunger linkages to the secondary plunger thereby providing an over-center locking mechanism that locks the secondary plunger at an outermost extension in the second direction from the primary plunger within the opening of the modular container.

The foregoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

The following detailed description of various embodiments herein makes reference to the accompanying drawings, which show various embodiments by way of illustration. While these various embodiments are described in sufficient detail to enable those skilled in the art to practice the disclosure, it should be understood that other embodiments may be realized and that changes may be made without departing from the scope of the disclosure. Thus, the detailed description herein is presented for purposes of illustration only and not of limitation. Furthermore, any reference to singular includes plural embodiments, and any reference to more than one component or step may include a singular embodiment or step. Also, any reference to attached, fixed, connected, or the like may include permanent, removable, temporary, partial, full or any other possible attachment option. Additionally, any reference to without contact (or similar phrases) may also include reduced contact or minimal contact. It should also be understood that unless specifically stated otherwise, references to "a," "an" or "the" may include one or more than one and that reference to an item in the singular may also include the item in the plural. Further, all ranges may include upper and lower values and all ranges and ratio limits disclosed herein may be combined.

When spacing cargo within a cargo compartment of an aircraft, spacing of palletized or containerized cargo is maintained to avoid inadvertent contact or load transfer between pallets or containers during flight. While, typically, the cargo hold layout is variable enough to allow for pallets or containers to be appropriately spaced to ensure no contact is made, in some instances, spacing within the cargo compartments may be reduced such that pallets or containers may contact each other during ground handling or in-flight.

Disclosed herein are systems and methods for utilizing a set of extending restraints that are coupled to the cargo compartment floor and comprise two actions, i.e. an extension in a y-direction or a port/starboard direction, and then an extension in a x-direction or a forward/aft direction. In various embodiments, the first extension in the y-direction engages with and prevents motion of the cargo in the x-direction. In various embodiments, the second extension in the x-direction engages with and prevents motion of the cargo in the y-direction thereby tightening spacing between the cargo. In various embodiments, these two actions may be accomplished via linkage systems that utilizes an over-center locking mechanism to ensure positive engagement of the pallet or container, thus ensuring no contact between pallets or containers could be made.

Figure 1:
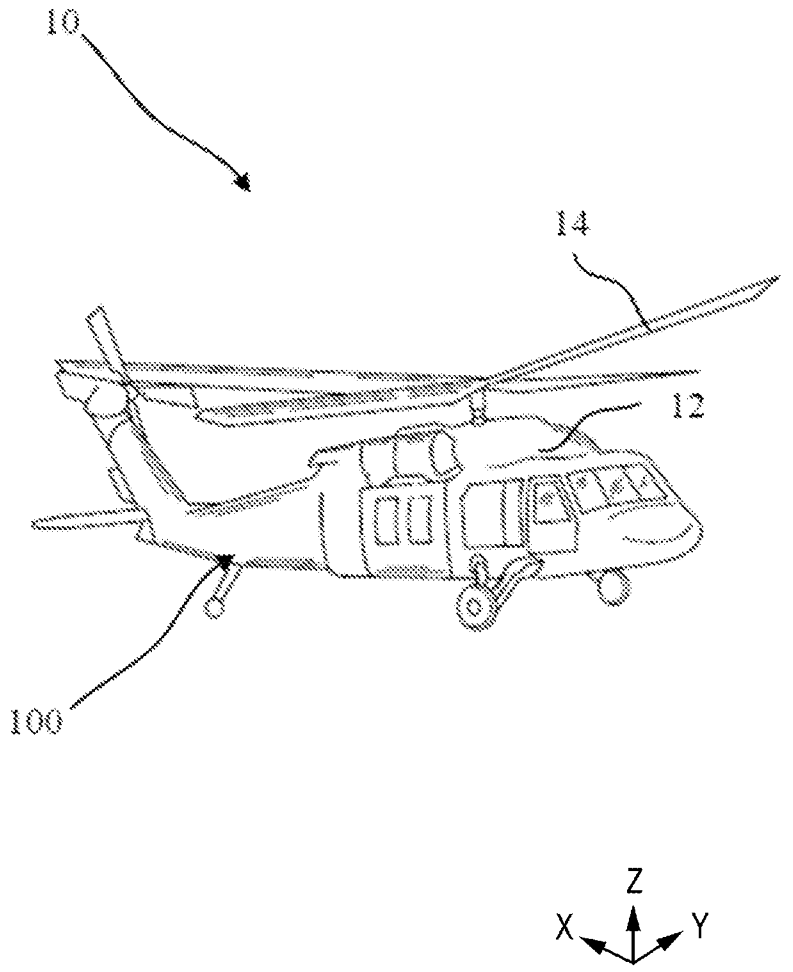
FIG. 1 illustrates an aircraft (e.g., a helicopter) with a cargo handling system is illustrated, in accordance with various embodiments.

Referring now to FIG. 1, an aircraft (e.g., a helicopter 10) with a cargo handling system 100 is illustrated, in accordance with various embodiments. The helicopter 10 includes an airframe 12 mechanically coupled to a main rotor 14. Main rotor 14 may include a plurality of rotary blades. In various embodiments, the cargo handling system 100 may be disposed at an aft end of the airframe 12.

Figure 2:
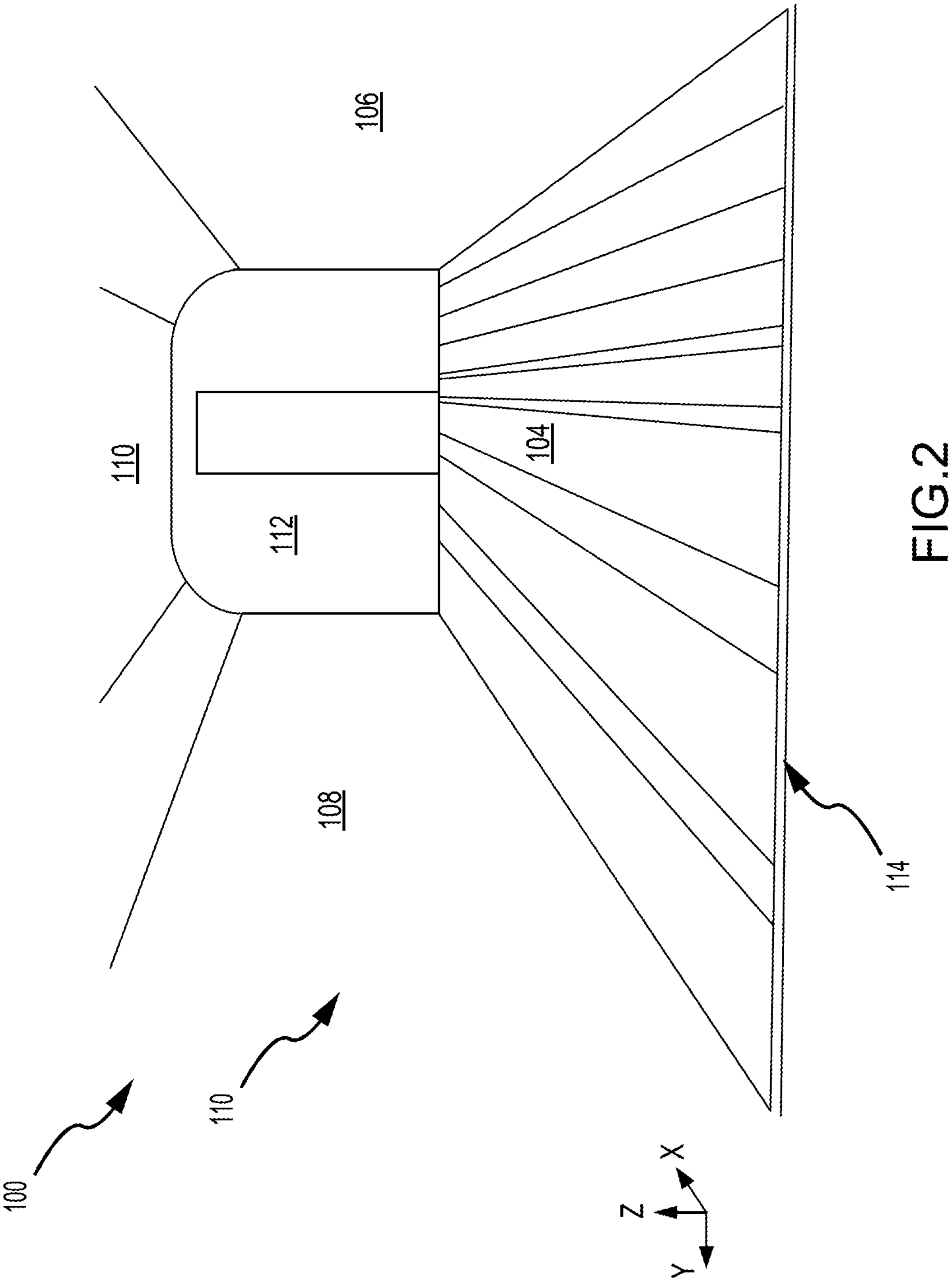
FIG. 2 illustrates a perspective view of a portion of a reconfigurable cargo handling system, in accordance with various embodiments.

Referring now to FIG. 2, the cargo handling system 100 from FIG. 1 is illustrated in a configuration for transportation of cargo, in accordance with various embodiments. In various embodiments, the cargo handling system 100 includes a cargo compartment 102 into which palletized or containerized cargo may be loaded. In various embodiments, the cargo compartment 102 includes a cargo deck 104, right side wall 106, left side wall 108, ceiling 110, forward end 112, and aft or rear end 114. In various embodiments, the cargo compartment 102 is defined by the forward end 112 and the aft or rear end 114 that is spaced from the forward end 112 along a length (or longitudinal) dimension of the cargo compartment 102. In various embodiments, the cargo compartment 102 is defined by the right side wall 106 and a left side wall 108 that is spaced from the right side wall 106 along a width (or lateral) dimension of the cargo compartment 102. In various embodiments, loading of the cargo into the cargo compartment 102 may be aided by roller trays coupled to or embedded within the cargo deck 104. In various embodiments, once the cargo is loaded, the cargo may be restrained by a set of restraint mechanisms that coupled to the cargo deck 104 via fittings that are either integrated into the cargo deck 104 or integrated into an in-floor adapter integrated within the cargo deck 104. In various embodiments, the fittings may be integrated into the roller trays that are coupled to or embedded within the cargo deck 104.

Figure 3:
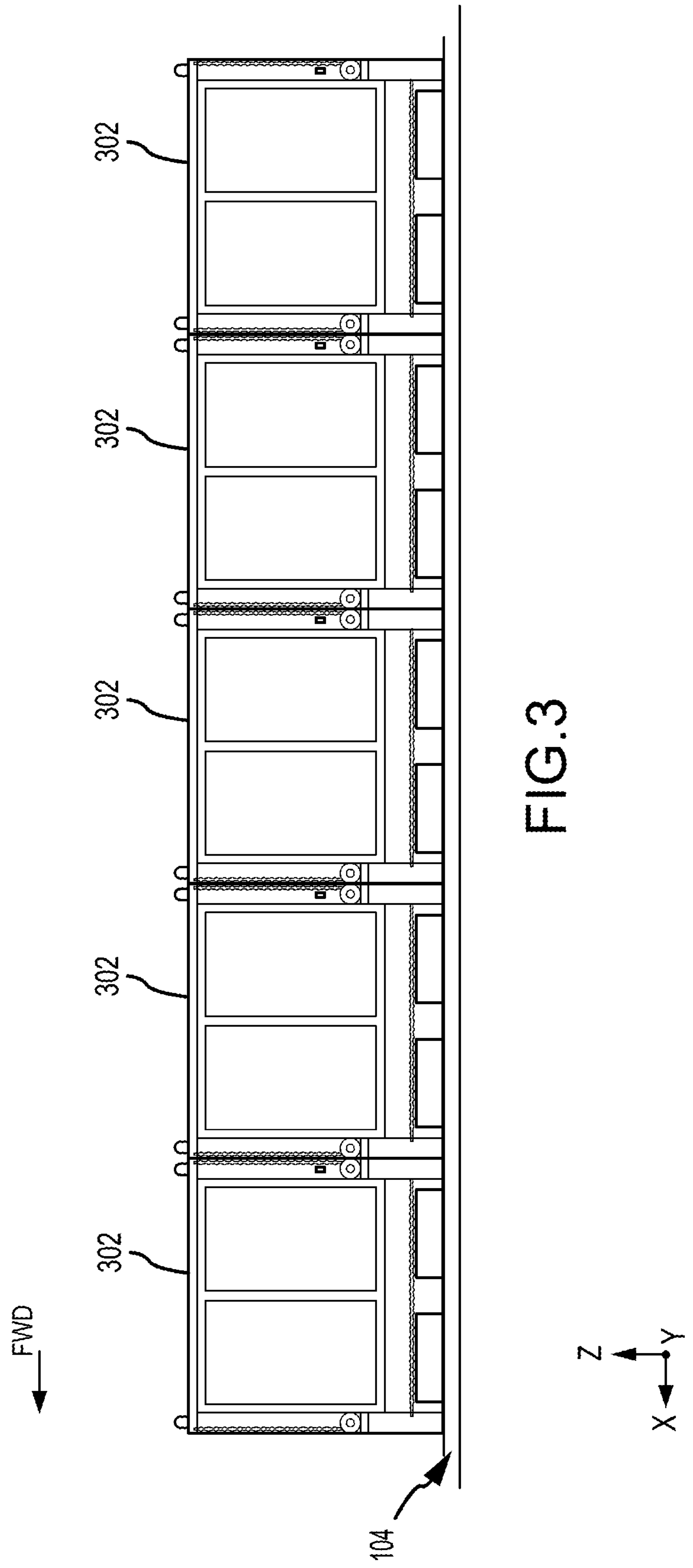
FIG. 3 illustrates a side view of a set of modular containers loaded into a cargo compartment of a cargo handling system, in accordance with various embodiments.

Referring now to FIG. 3, a side view of a set of modular containers loaded into a cargo compartment 102 of a cargo handling system 100 from FIG. 2 is illustrated, in accordance with various embodiments. In various embodiments, the modular containers 302 are loaded onto the cargo deck 104 and spaced apart in a forward (FWD) direction along the cargo deck 104. In various embodiments, the modular containers 302 may be spaced apart from each other. In various embodiments, the spacing may be between ¼ inch (0.635 centimeter) and 1 inch (2.54 centimeters). In various embodiments, the spacing may be between ¼ inch (0.635 centimeter) and ½ inch (1.27 centimeters). In various embodiments, the spacing may be 5⁄16 inch (0.7937 centimeter).

Figure 4:
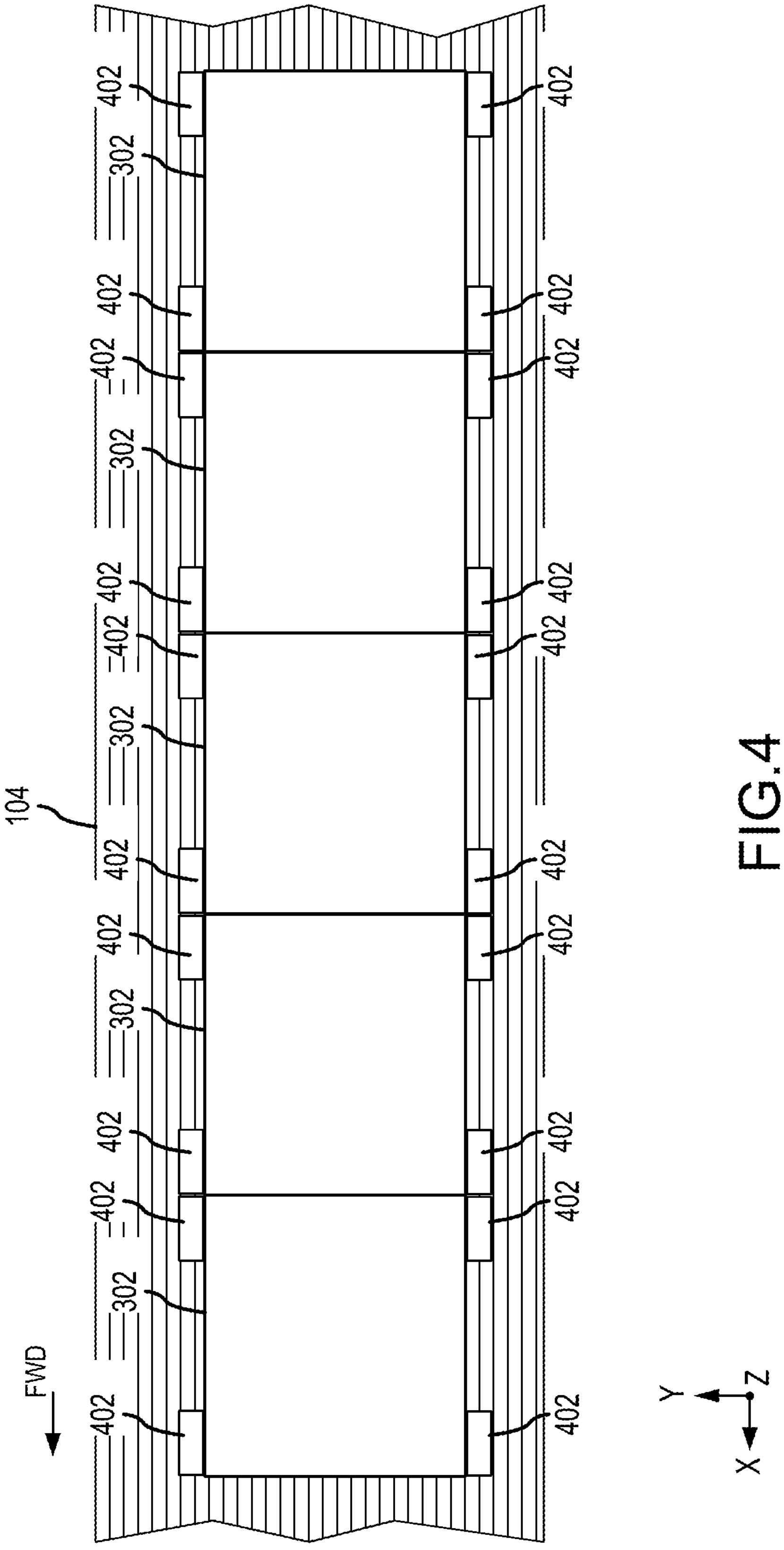
FIG. 4 illustrates a top view of a set of modular containers loaded into a cargo compartment of a cargo handling system, in accordance with various embodiments.

Referring now to FIG. 4, a top view of a set of modular containers loaded into a cargo compartment 102 of a cargo handling system 100 from FIG. 2 is illustrated, in accordance with various embodiments. In various embodiments, the modular containers 302 are loaded onto the cargo deck 104 and spaced apart in a forward (FWD) direction along the cargo deck 104. In various embodiments, each of the modular containers 302 may be restrained by a set of extending cargo restraint assemblies 402 that are each coupled to the cargo deck 104 and positioned adjacent to the corners of each of the modular containers 302.

Figure 5A:
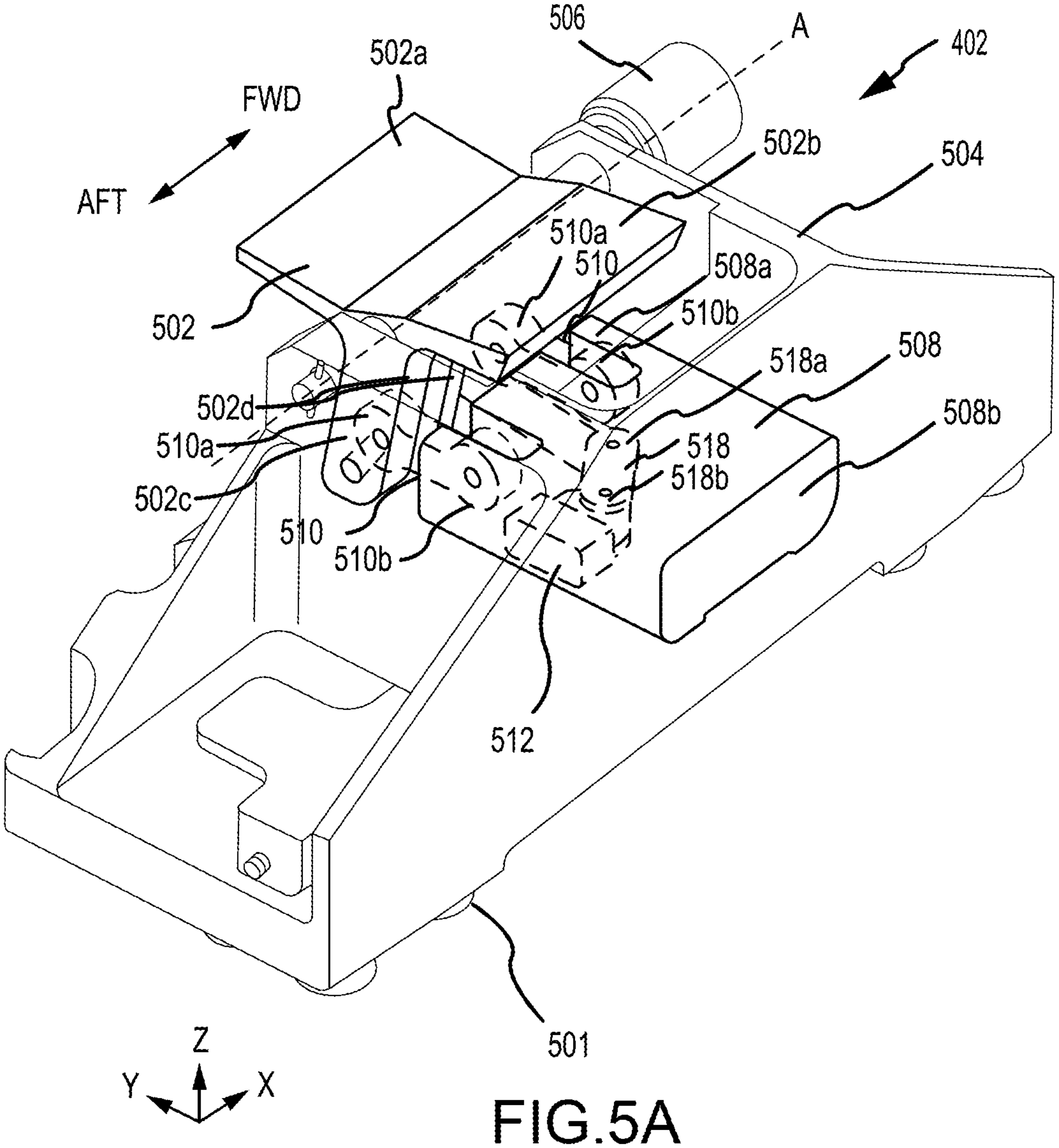
FIGS. 5A and 5B illustrate an isometric view and a side view of an extending cargo restraint assembly, in accordance with various embodiments.
Figure 5B:
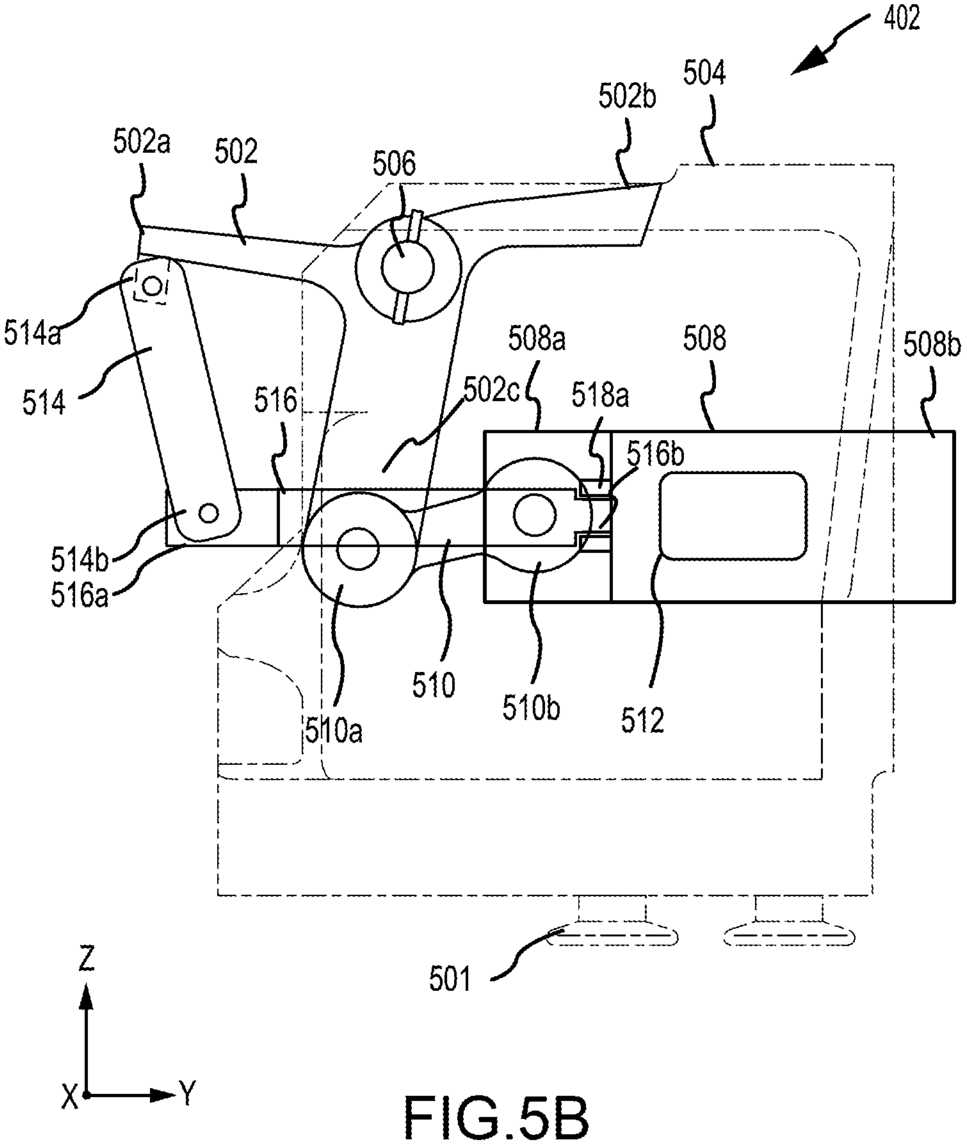

Referring now to FIGS. 5A and 5B, an isometric view and a side view of an extending cargo restraint assembly 402 is illustrated, in accordance with various embodiments. In various embodiments, the extending cargo restraint assembly 402 may be coupled to cargo deck 104 via fittings that are either integrated into the cargo deck 104 or integrated into an in-floor adapter within the cargo deck 104 and via a set of anchors 501 integrated into the extending cargo restraint assembly 402. In various embodiments, the extending cargo restraint assembly 402 includes an actuation lever 502 that is coupled to base assembly 504 of the extending cargo restraint assembly 402 via a coupling pin 506. In that regard, in various embodiments, the actuation lever 502 rotates about axis A through a longitudinal center of the coupling pin 506.

In various embodiments, the actuation lever 502 is substantially "T" shaped structure with an activation end 502*a*, a deactivation end 502*b*, and a linkage connector end 502*c*. In various embodiments, the linkage connector end 502*c* is mechanically coupled to primary plunger 508 via a set of intermediate linkages 510. In various embodiments, the linkage connector end 502*c* includes two sets of tines 502*d*. Accordingly, each set of the set of tines 502*d* of the linkage connector end 502*c* are positioned on either side of a respective one of a first end 510*a* of a respective intermediate linkages 510. In that regard, the linkage connector end 502*c* is mechanically and rotatably coupled the first end 510*a* of a respective intermediate linkages 510. In various embodiments, a second end 510*b* of a respective intermediate linkages 510 is mechanically and rotatably coupled to a proximal end 508*a* of the primary plunger 508. In various embodiments, a distal end 508*b* of the primary plunger 508 is configured to extend outwardly, in a y-direction, from the base assembly 504 into the lower portion of the modular container. In various embodiments, the lower portion of the modular container may be an area or opening in the bottom of the modular container utilized to lift and move the modular container, such as a portion where forks of a forklift may slide under the modular container. In that regard, responsive to being extended, the primary plunger 508 provides restraint in an x-direction, i.e. preventing the modular container from moving in an x-direction.

In various embodiments, included within an internal chamber of the primary plunger 508 is a secondary plunger 512 that is configured to extend outwardly, in a x-direction, from the primary plunger 508 thereby providing further restraint in the x-direction as well as self-centering when paired with another extending cargo restraint assembly 402 at an opposite end, in the x-direction, of the modular container. In various embodiments, the activation end 502*a* is coupled to secondary plunger 512 via a first set of secondary plunger linkages 514, a secondary plunger rod 516, and a second set of secondary plunger linkages 518. In various embodiments, a first end 514*a* of the first set of secondary plunger linkages 514 is mechanically and rotatably coupled to the activation end 502*a* of the actuation lever 502. In various embodiments, a second end 514*b* of the first set of secondary plunger linkages 514 is mechanically and rotatably coupled to a proximal end 516*a* of the secondary plunger rod 516. In various embodiments, a distal end 516*b* of the secondary plunger rod 516 is mechanically and rotatably coupled to a first end 518*a* of the second set of secondary plunger linkages 518. In various embodiments, a second end 518*b* of the second set of secondary plunger linkages 518 is mechanically and rotatably coupled to the secondary plunger 512. In various embodiments, as the primary plunger 508 extends outwardly, in a y-direction, into the lower portion of the modular container, the secondary plunger 512 is configured to extend outwardly from the primary plunger 508, in a x-direction, engaging with an interior portion of the area or opening in the bottom of the modular container and providing further restraint in the x-direction as well as self-centering when paired with another extending cargo restraint assembly 402 at an opposite end, in the x-direction, of the modular container thereby tightening spacing between the cargo. That is, in various embodiments, the extending cargo restraint assembly 402 with a secondary plunger 512 that extends in a negative x-direction as illustrated in FIG. 5A may be paired with another extending cargo restraint assembly 402 with a secondary plunger 512 that extends in a positive x-direction.

Figure 6:
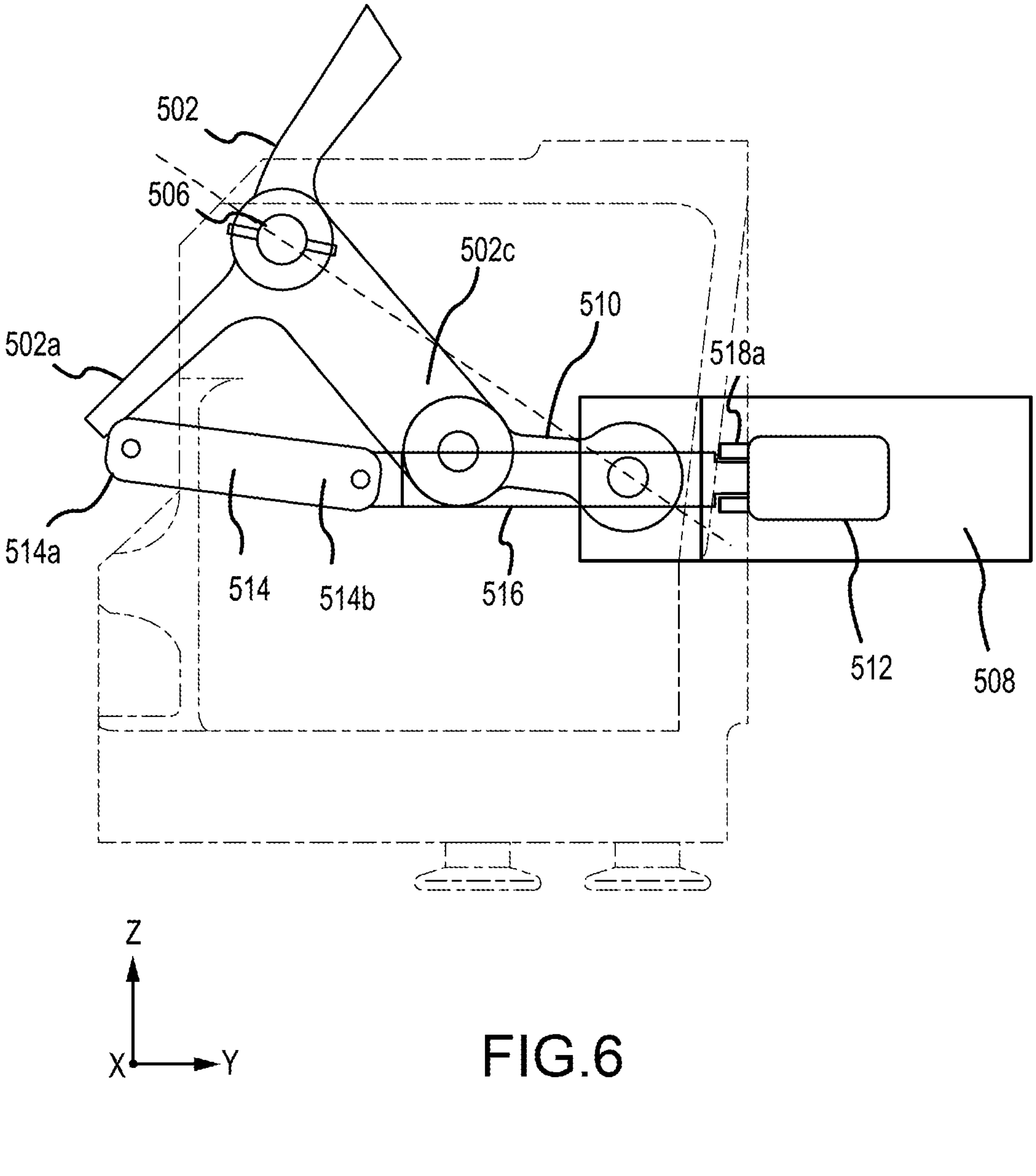
FIG. 6 illustrates a side view of an extending cargo restraint assembly being activated is illustrated, in accordance with various embodiments.

Referring now to FIG. 6, a side view of an extending cargo restraint assembly 402 being activated is illustrated, in accordance with various embodiments. In various embodiments, as a user depresses the activation end 502*a* of the actuation lever 502 in a negative z-direction or vertical direction, due to the actuation lever 502 rotating about axis A through a longitudinal center of the coupling pin 506 as shown in FIG. 5A, the linkage connector end 502*c* of the actuation lever 502 is configured to move in a positive y-direction, which, in turn, applies a force to the intermediate linkages 510 such that the intermediate linkages 510 move in a positive y-direction. In various embodiments, the movement of the intermediate linkages 510 in the positive y-direction is configured to cause the primary plunger 508 to extends outwardly, in a y-direction, from the base assembly 504 into the lower portion of the modular container. Further description of the extension of the primary plunger 508 is described hereafter with regard to FIGS. 7A, 7B, and 7C.

Additionally, in various embodiments, as a user depresses the activation end 502*a* of the actuation lever 502 in a negative z-direction, first end 514*a* of the first set of secondary plunger linkages 514 is configured to move in a negative z-direction which forces the second end of the first set of secondary plunger linkages 514 to move in positive y-direction. In various embodiments, since the second end of the first set of secondary plunger linkages 514 is mechanically and rotatably coupled to the secondary plunger rod 516, the secondary plunger rod 516, which is configured to move only in the y-direction, is configured to move in a positive y-direction, which forces the first end 518*a* of the second set of secondary plunger linkages 518 to move outward in a positive y-direction and the second end 518*b* of the second set of secondary plunger linkages 518 to move outward in a negative x-direction. In various embodiments, by the second end 518*b* of the second set of secondary plunger linkages 518 being forced outward in a negative x-direction, the secondary plunger 512 is configured to extend outwardly from the primary plunger 508 in a negative x-direction thereby engaging with an interior portion of the area or opening in the bottom of the modular container and providing further restraint in the x-direction as well as self-centering when paired with another extending cargo restraint assembly 402 at an opposite end, in the x-direction, of the modular container thereby tightening spacing between the modular containers. Further description of the extension of the secondary plunger 512 is described hereafter with regard to FIGS. 7A, 7B, 7C, 8A, 8B, 9A, and 9B.

Figure 7A:
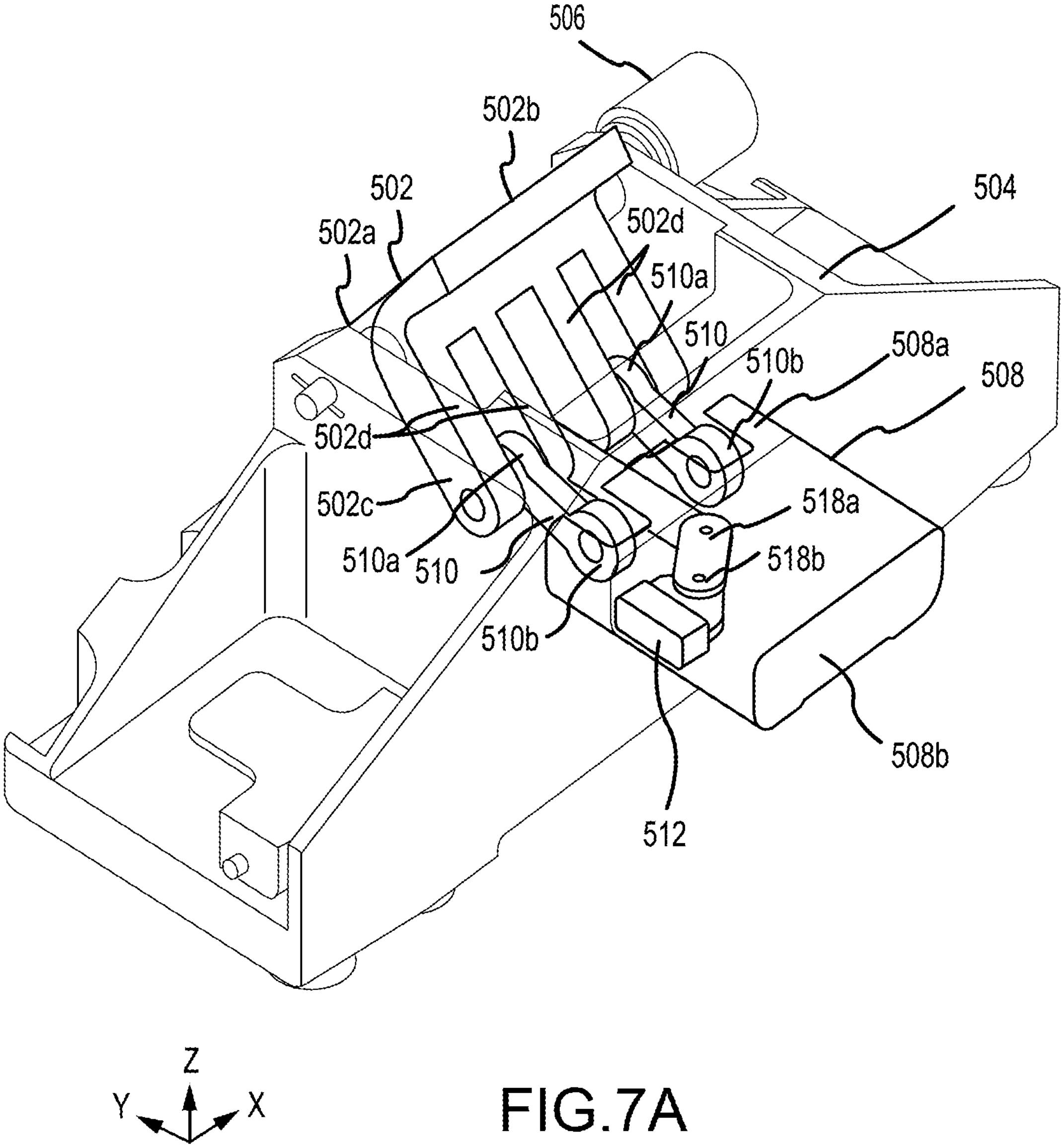
FIGS. 7A, 7B, and 7C illustrate an isometric view and side views of an extending cargo restraint assembly being activated is illustrated, in accordance with various embodiments.
Figure 7B:
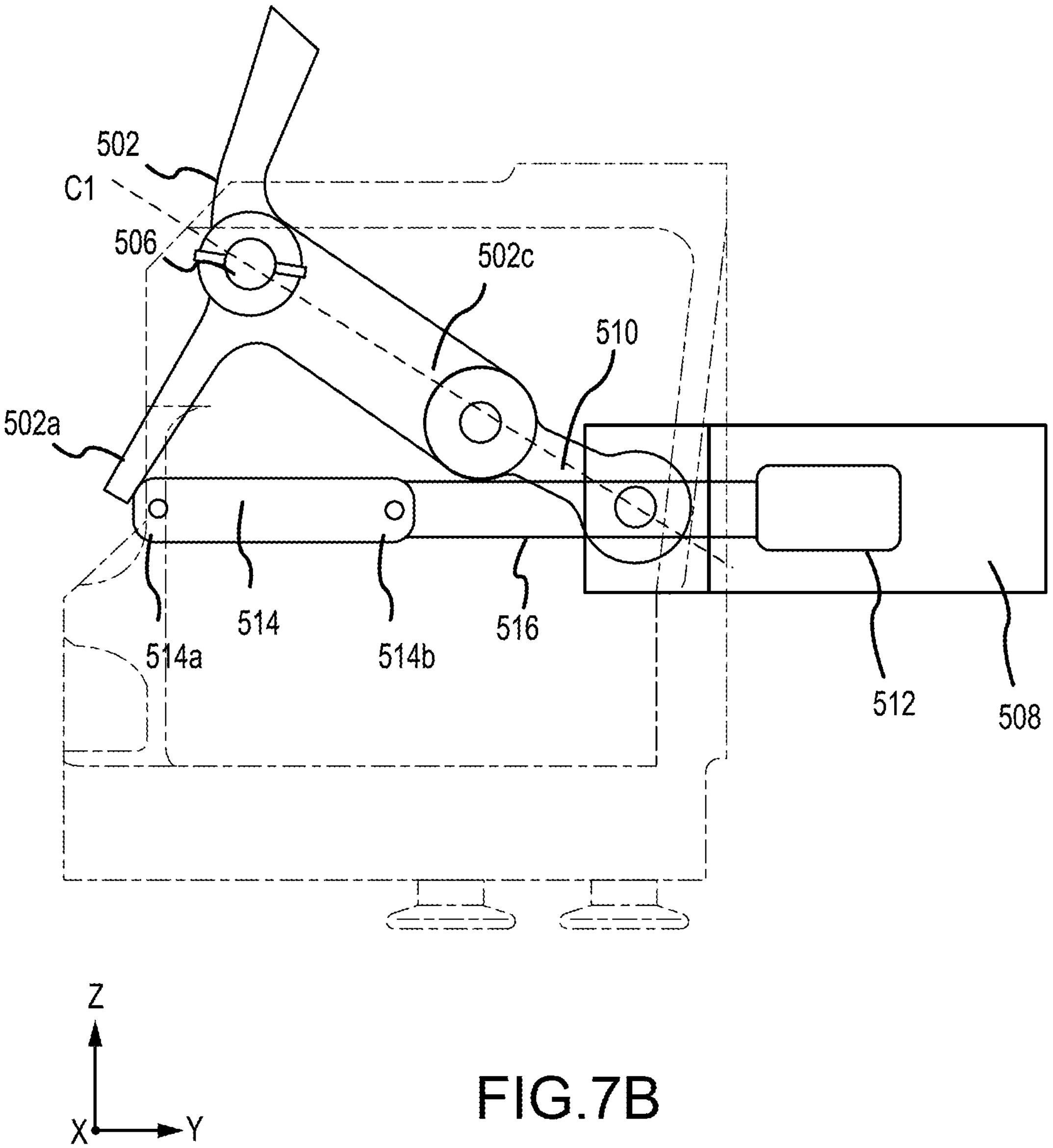
Figure 7C:
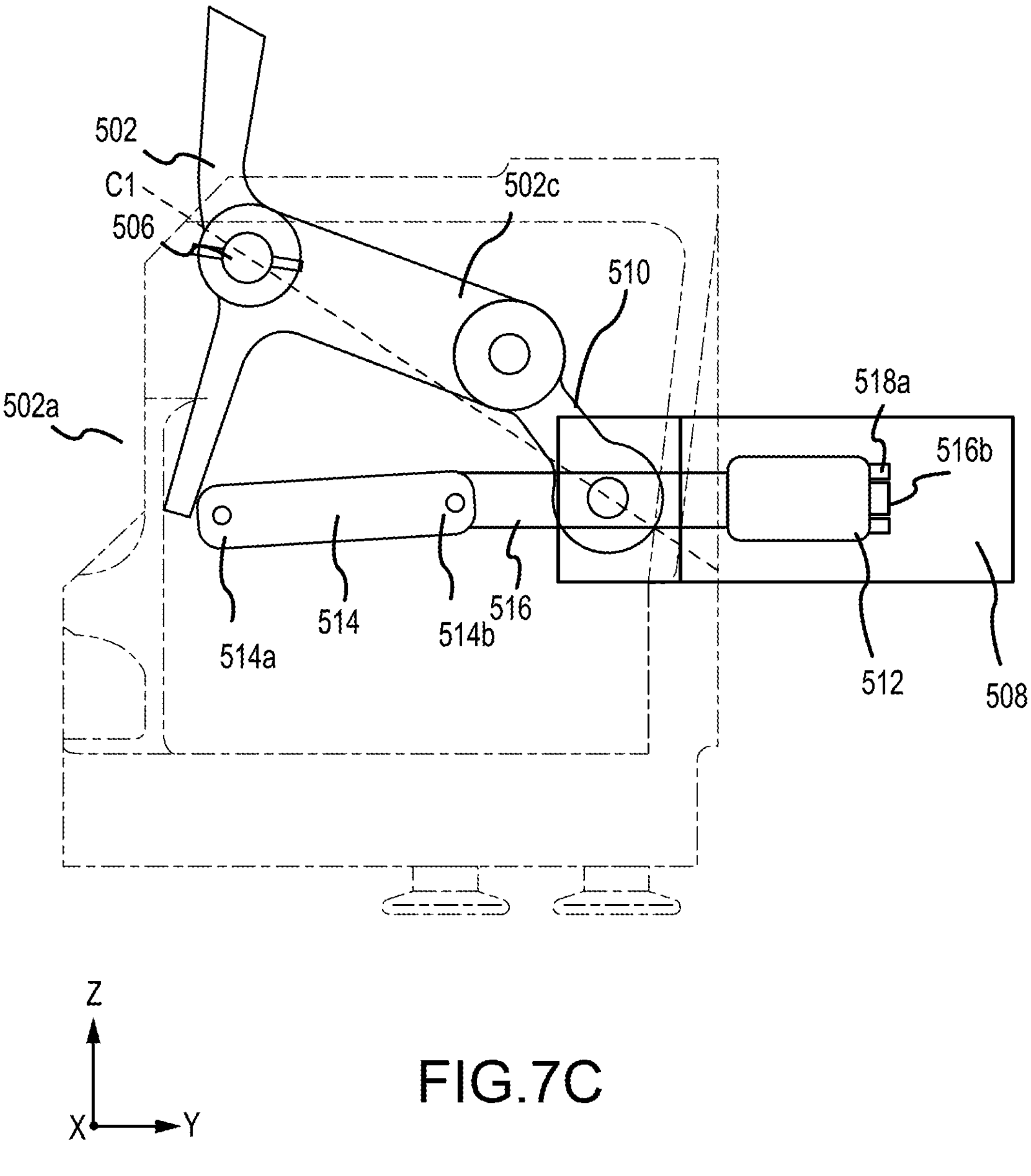

Referring now to FIGS. 7A, 7B, and 7C, an isometric view and side views of an extending cargo restraint assembly 402 being activated is illustrated, in accordance with various embodiments. In various embodiments, as the user continues to depress the activation end 502*a* of the actuation lever 502 in a negative z-direction, due to the actuation lever 502 rotating about axis A through a longitudinal center of the coupling pin 506 as shown in FIG. 5A, the linkage connector end 502*c* of the actuation lever 502 is configured to move further in the positive y-direction, which, in turn, applies a force to the intermediate linkages 510 such that mechanically and rotatably coupled joint of the linkage connector end 502*c* and the first end 510*a* of the intermediate linkages 510 first nears the center line C1 between the coupling of the second end of the intermediate linkages 510 and the coupling pin 506, as shown in FIG. 7B, and then is configured to move over the center line C1, as shown in FIG. 7C. In various embodiments, by the joint of the linkage connector end 502*c* and the first end 510*a* of the intermediate linkages 510 moving over the center line C1, as shown in FIG. 7C, an over-center locking mechanism is provided that locks the primary plunger 508 at its outermost extension in the y-direction from the base assembly 504 into the lower portion of the modular container. In various embodiments, the joint of the linkage connector end 502*c* and the first end 510*a* of the intermediate linkages 510 is prevented from moving further due to the secondary plunger 512 mechanism which is controlled via the first set of secondary plunger linkages 514, the secondary plunger rod 516, and the second set of secondary plunger linkages 518.

Figure 8A:
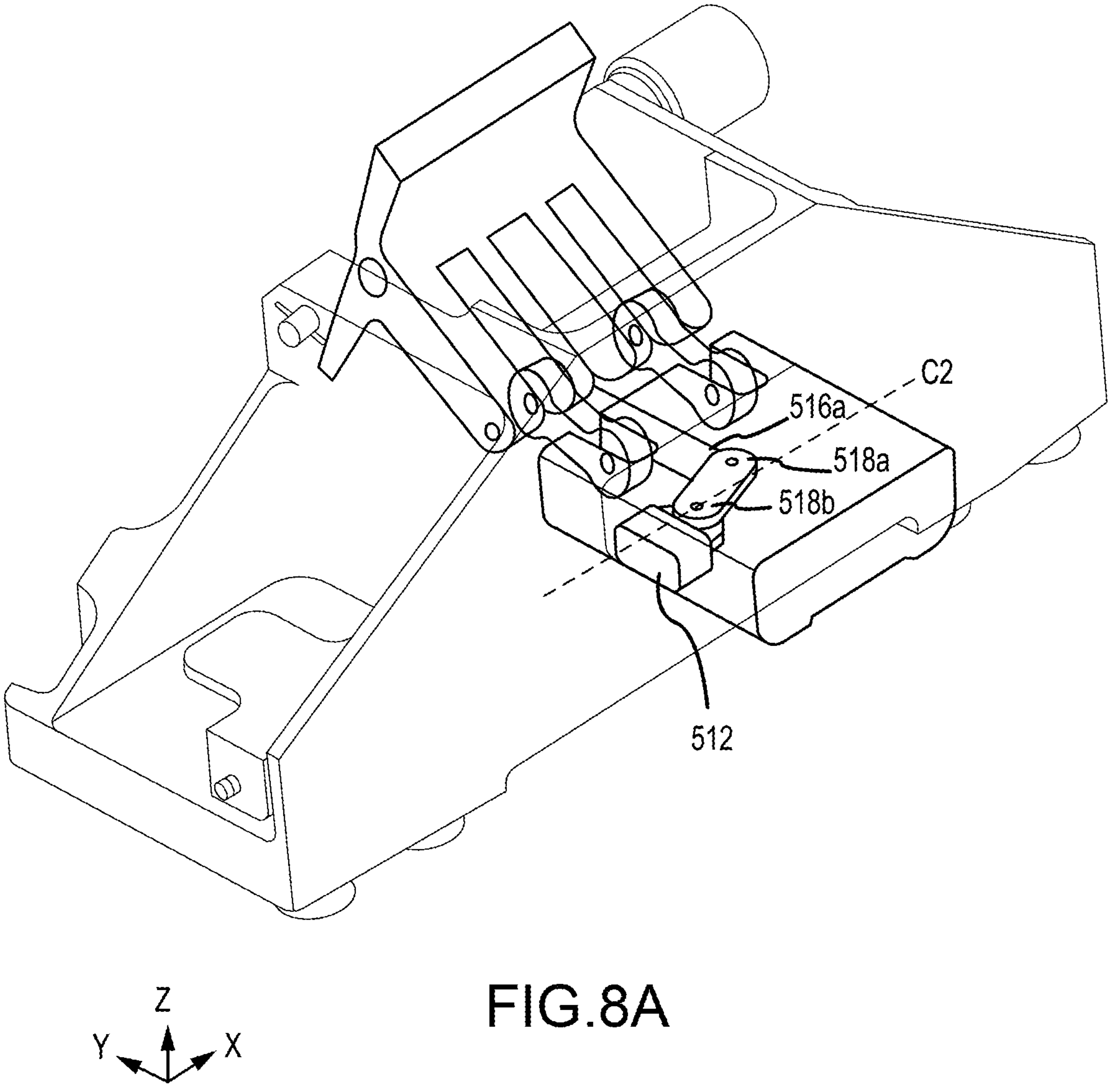
FIGS. 8A and 8B illustrate and isometric view and a top view of an extending cargo restraint assembly being activated, in accordance with various embodiments.
Figure 8B:
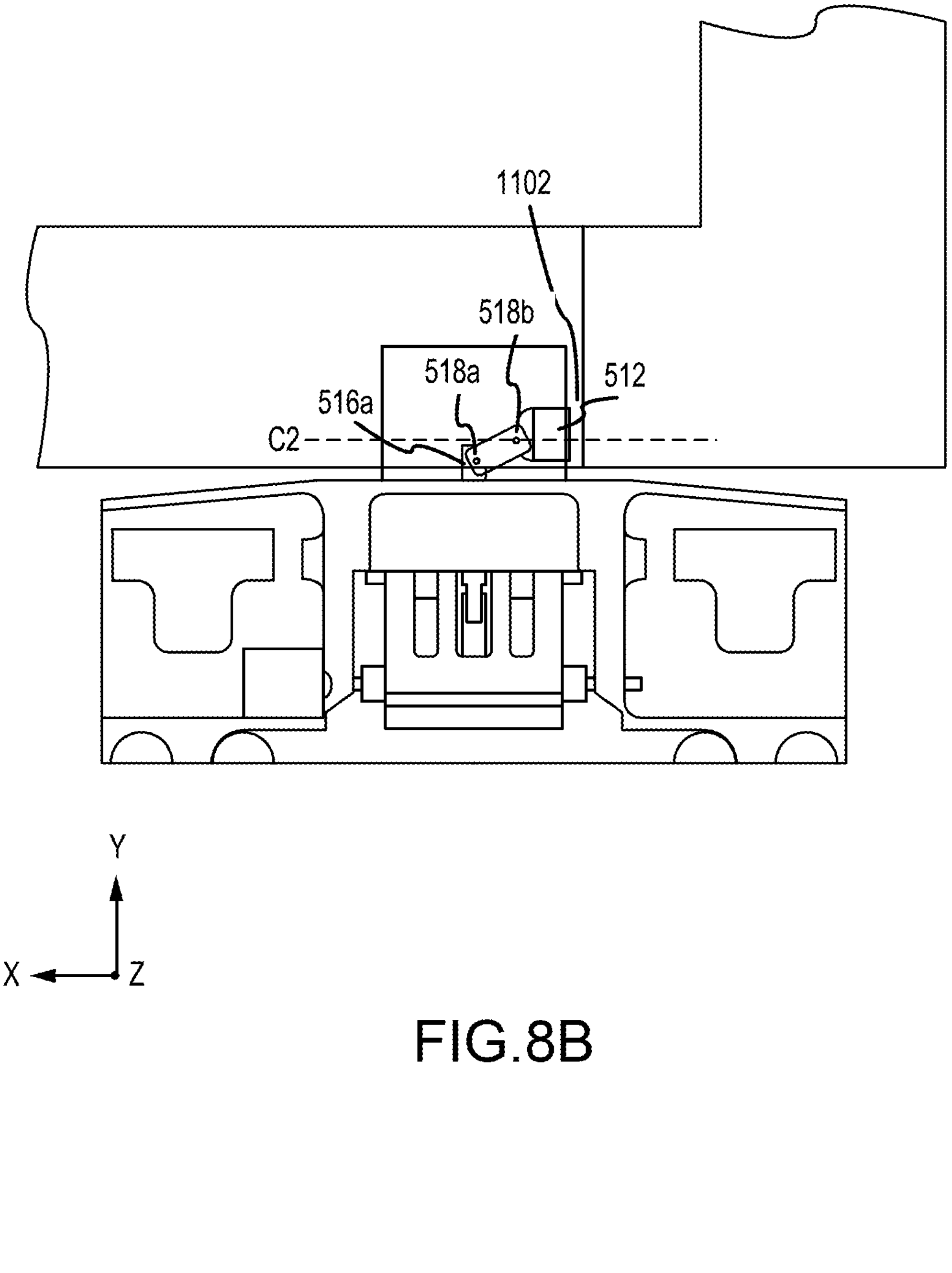
Figure 9A:
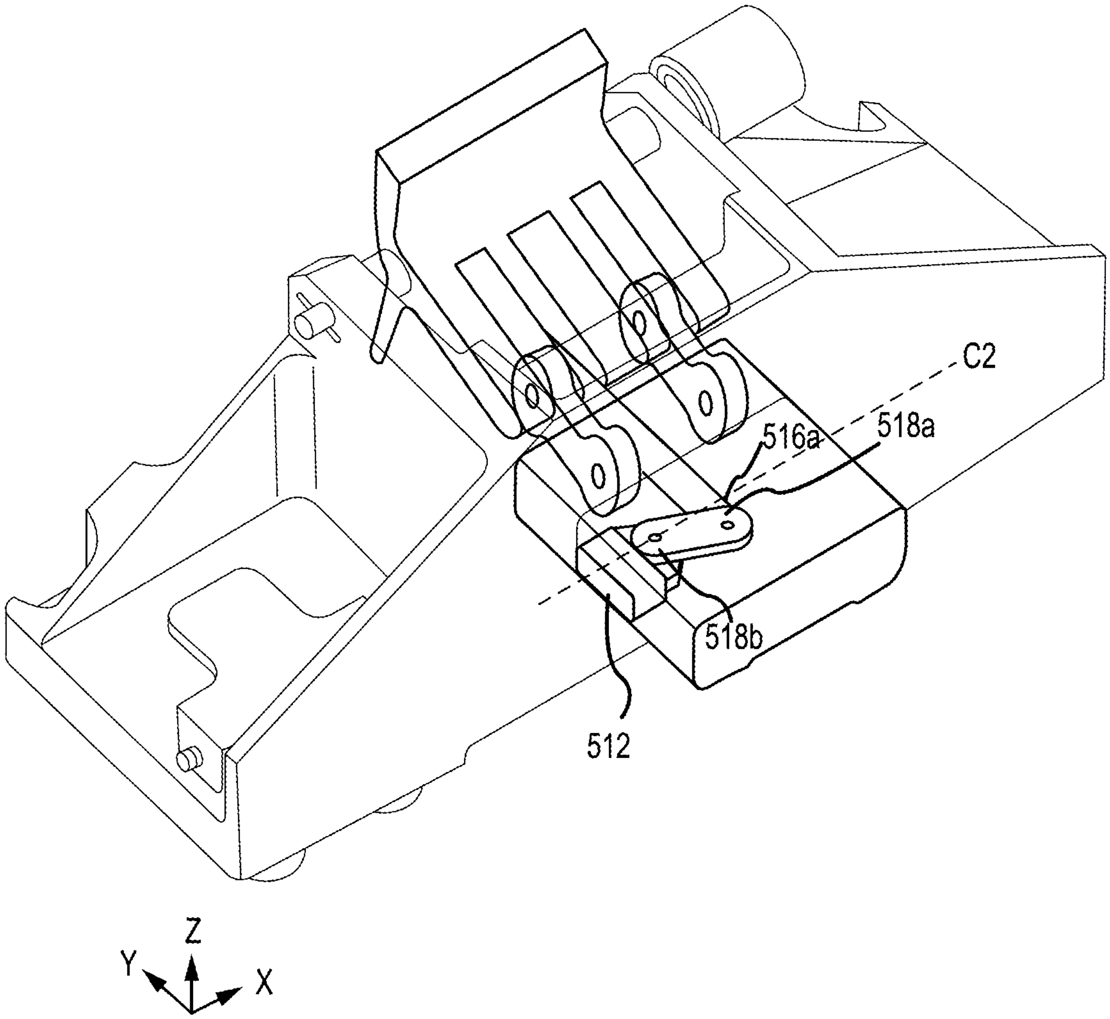
FIGS. 9A and 9B illustrate and isometric view and a top view of an extending cargo restraint assembly being activated, in accordance with various embodiments.
Figure 9B:
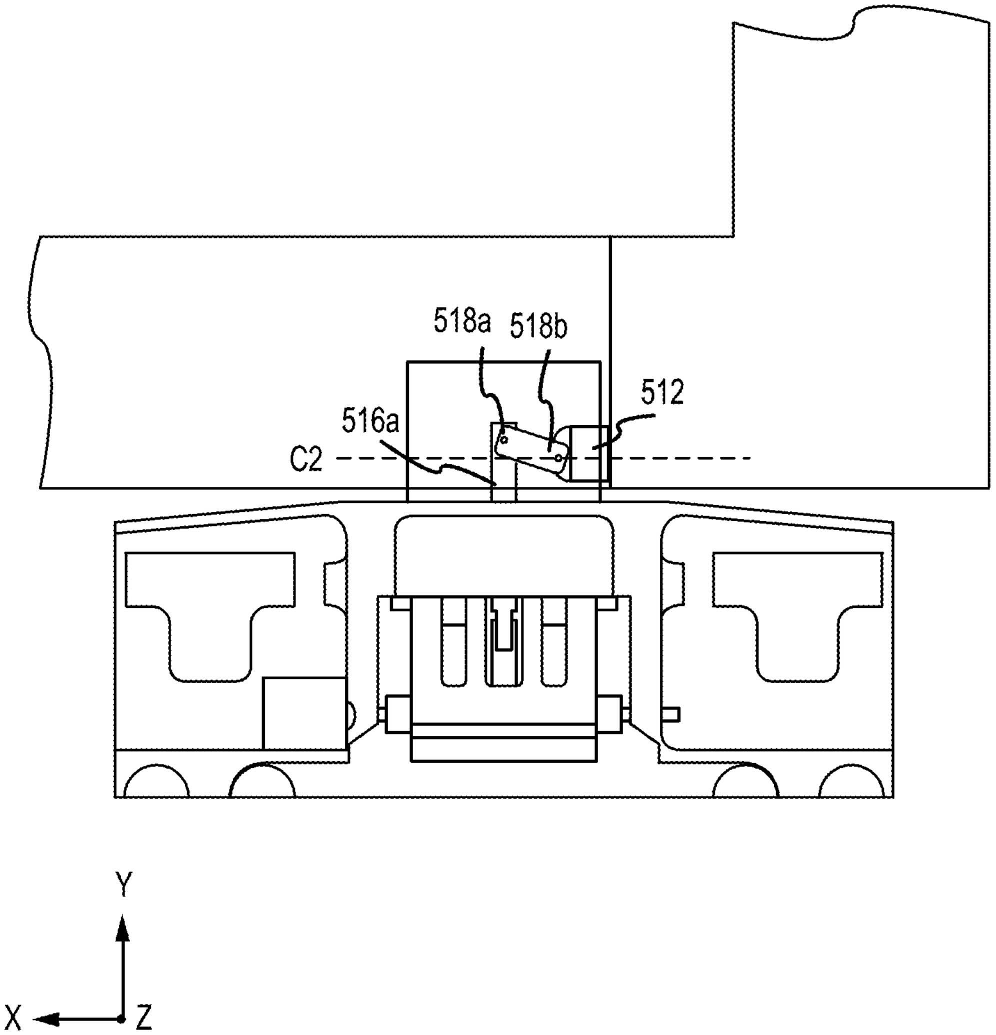

With continued reference to FIGS. 7A, 7B, and 7C and further reference to FIGS. 8A, 8B, 9A, and 9B, which illustrate isometric views and top views of an extending cargo restraint assembly 402 being activated, in accordance with various embodiments, as a user continues to depress the activation end 502*a* of the actuation lever 502 in the negative z-direction, first end 514*a* of the first set of secondary plunger linkages 514 is configured to move further the negative z-direction which forces the second end of the first set of secondary plunger linkages 514 to move further in positive y-direction. In various embodiments, since the second end of the first set of secondary plunger linkages 514 is coupled to the secondary plunger rod 516, the secondary plunger rod 516 is configured to move in a positive y-direction, which forces the first end 518*a* of the second set of secondary plunger linkages 518 outward in a positive y-direction such that the first end 518*a* of the second set of secondary plunger linkages 518 nears the center line C2 between a middle of the secondary plunger 512 in the y-direction and the coupling of the second end 518*b* of the second set of secondary plunger linkages 518 to the secondary plunger 512, as shown in FIGS. 8A and 8B, and then is configured to move over the center line C2, as shown in FIGS. 9A and 9B. In various embodiments, a mechanical and rotatable joint of the distal end 516*b* of the secondary plunger rod 516 and the first end 518*a* of the second set of secondary plunger linkages 518 moving over the center line C2, as shown in FIGS. 9A and 9B, an over-center locking mechanism is provided that locks the secondary plunger 512 at its outermost extension in the negative x-direction negative x-direction.

Benefits and other advantages have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods, and apparatus are provided herein. In the detailed description herein, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An extending cargo restraint assembly for a cargo handling system, comprising:
 a base assembly comprising:
  a primary plunger; and
  a secondary plunger, wherein the secondary plunger is positioned within an internal chamber of the primary plunger,
  wherein, responsive to being activated, the primary plunger is configured to extend in a first direction into an opening within a modular container thereby restraining the modular container in a second direction, the second direction being perpendicular to the first direction, and
  wherein, responsive to being activated, the secondary plunger is configured to extend in the second direction within the opening of the modular container thereby further restraining the modular container in the second direction.

2. The extending cargo restraint assembly of claim 1, wherein the base assembly further comprises:

an actuation lever, wherein the actuation lever is coupled to the base assembly via a coupling pin and is configured to rotate about an axis through a longitudinal center of the coupling pin and wherein the actuation lever is further coupled to the primary plunger and the secondary plunger.

3. The extending cargo restraint assembly of claim 2, wherein the actuation lever comprises:

a linkage connector end, wherein the linkage connector end is mechanically and rotatably coupled to the primary plunger via a set of intermediate linkages and wherein, responsive to the actuation lever being depressed in a vertical direction, the linkage connector end moves substantially in the first direction thereby forcing the set of intermediate linkages to move substantially in the first direction extending the primary plunger in the first direction into the opening within the modular container.

4. The extending cargo restraint assembly of claim 3, wherein a mechanical and rotatable coupling between the linkage connector end and the set of intermediate linkages is configured to move over a center line established between a coupling of the set of intermediate linkages to the primary plunger and the coupling pin thereby providing an over-center locking mechanism that locks the primary plunger at an outermost extension in the first direction from the base assembly into the opening within the modular container.

5. The extending cargo restraint assembly of claim 2, wherein the actuation lever comprises:

an activation end, wherein the activation end is mechanically and rotatably coupled to the secondary plunger via a first set of secondary plunger linkages, a secondary plunger rod, and a second set of secondary plunger linkages, wherein, responsive to the actuation lever being depressed in a vertical direction, a first end of the first set of secondary plunger linkages is configured to move in a downward direction thereby forcing a second end of the first set of secondary plunger linkages to move in the first direction, wherein, responsive to the second end of the first set of secondary plunger linkages moving in the first direction, the secondary plunger rod is configured to move in the first direction thereby forcing a first end of the second set of secondary plunger linkages to move in the first direction, wherein, responsive to the first end of the second set of secondary plunger linkages moving in the first direction, the second end of the second set of secondary plunger linkages is configured to move in the second direction thereby forcing the secondary plunger to extend outwardly from the primary plunger in the second direction.

6. The extending cargo restraint assembly of claim 5, wherein a mechanical and rotatable coupling between a distal end of the secondary plunger rod and the first end of the second set of secondary plunger linkages is configured to move over a center line established between a middle of the secondary plunger in the first direction and a coupling of the second end of the second set of secondary plunger linkages to the secondary plunger thereby providing an over-center locking mechanism that locks the secondary plunger at an outermost extension in the second direction from the primary plunger within the opening of the modular container.

7. A cargo handling system, comprising:

a plurality of extending cargo restraint assemblies, each extending cargo restraint assembly of the plurality of extending cargo restraint assemblies comprising:

a base assembly comprising:

a primary plunger; and a secondary plunger, wherein the secondary plunger is positioned within an internal chamber of the primary plunger, wherein, responsive to being activated, the primary plunger is configured to extend in a first direction into an opening within a modular container thereby restraining the modular container in a second direction, the second direction being perpendicular to the first direction, and wherein, responsive to being activated, the secondary plunger is configured to extend in the second direction within the opening of the modular container thereby further restraining the modular container in the second direction.

8. The cargo handling system of claim 7, wherein the base assembly further comprises:

an actuation lever, wherein the actuation lever is coupled to the base assembly via a coupling pin and is configured to rotate about an axis through a longitudinal center of the coupling pin and wherein the actuation lever is further coupled to the primary plunger and the secondary plunger.

9. The cargo handling system of claim 8, wherein the actuation lever comprises:

a linkage connector end, wherein the linkage connector end is mechanically and rotatably coupled to the primary plunger via a set of intermediate linkages and wherein, responsive to the actuation lever being depressed in a vertical direction, the linkage connector end moves substantially in the first direction thereby forcing the set of intermediate linkages to move substantially in the first direction extending the primary plunger in the first direction into the opening within the modular container.

10. The cargo handling system of claim 9, wherein a mechanical and rotatable coupling between the linkage connector end and the set of intermediate linkages is configured to move over a center line established between a coupling of the set of intermediate linkages to the primary plunger and the coupling pin thereby providing an over-center locking mechanism that locks the primary plunger at an outermost extension in the first direction from the base assembly into the opening within the modular container.

11. The cargo handling system of claim 8, wherein the actuation lever comprises:

an activation end, wherein the activation end is mechanically and rotatably coupled to the secondary plunger via a first set of secondary plunger linkages, a secondary plunger rod, and a second set of secondary plunger linkages, wherein, responsive to the actuation lever being depressed in a vertical direction, a first end of the first set of secondary plunger linkages is configured to move in a downward direction thereby forcing a second end of the first set of secondary plunger linkages to move in the first direction, wherein, responsive to the second end of the first set of secondary plunger linkages moving in the first direction, the secondary plunger rod is configured to move in the first direction thereby forcing a first end of the second set of secondary plunger linkages to move in the first direction, wherein, responsive to the first end of the second set of secondary plunger linkages moving in the first direction, the second end of the second set of secondary plunger linkages is configured to move in the second direction thereby forcing the secondary plunger to extend outwardly from the primary plunger in the second direction.

12. The cargo handling system of claim 11, wherein a mechanical and rotatable coupling between a distal end of the secondary plunger rod and the first end of the second set of secondary plunger linkages is configured to move over a center line established between a middle of the secondary plunger in the first direction and a coupling of the second end of the second set of secondary plunger linkages to the secondary plunger thereby providing an over-center locking mechanism that locks the secondary plunger at an outermost extension in the second direction from the primary plunger within the opening of the modular container.

13. An aircraft, comprising:

a cargo deck; and a cargo handling system disposed on the cargo deck, the cargo handling system comprising:

a plurality of extending cargo restraint assemblies, each extending cargo restraint assembly of the plurality of extending cargo restraint assemblies comprising:

a base assembly comprising:

a primary plunger; and a secondary plunger, wherein the secondary plunger is positioned within an internal chamber of the primary plunger, wherein, responsive to being activated, the primary plunger is configured to extend in a first direction into an opening within a modular container thereby restraining the modular container in a second direction, the second direction being perpendicular to the first direction, and wherein, responsive to being activated, the secondary plunger is configured to extend in the second direction within the opening of the modular container thereby further restraining the modular container in the second direction.

14. The aircraft of claim 13, wherein the base assembly further comprises:

an actuation lever, wherein the actuation lever is coupled to the base assembly via a coupling pin and is configured to rotate about an axis through a longitudinal center of the coupling pin and wherein the actuation lever is further coupled to the primary plunger and the secondary plunger.

15. The aircraft of claim 14, wherein the actuation lever comprises:

a linkage connector end, wherein the linkage connector end is mechanically and rotatably coupled to the primary plunger via a set of intermediate linkages and wherein, responsive to the actuation lever being depressed in a vertical direction, the linkage connector end moves substantially in the first direction thereby forcing the set of intermediate linkages to move substantially in the first direction extending the primary plunger in the first direction into the opening within the modular container.

16. The aircraft of claim 15, wherein a mechanical and rotatable coupling between the linkage connector end and the set of intermediate linkages is configured to move over a center line established between a coupling of the set of intermediate linkages to the primary plunger and the coupling pin thereby providing an over-center locking mechanism that locks the primary plunger at an outermost extension in the first direction from the base assembly into the opening within the modular container.

17. The aircraft of claim 14, wherein the actuation lever comprises:

an activation end, wherein the activation end is mechanically and rotatably coupled to the secondary plunger via a first set of secondary plunger linkages, a secondary plunger rod, and a second set of secondary plunger linkages, wherein, responsive to the actuation lever being depressed in a vertical direction, a first end of the first set of secondary plunger linkages is configured to move in a downward direction thereby forcing a second end of the first set of secondary plunger linkages to move in the first direction, wherein, responsive to the second end of the first set of secondary plunger linkages moving in the first direction, the secondary plunger rod is configured to move in the first direction thereby forcing a first end of the second set of secondary plunger linkages to move in the first direction, wherein, responsive to the first end of the second set of secondary plunger linkages moving in the first direction, the second end of the second set of secondary plunger linkages is configured to move in the second direction thereby forcing the secondary plunger to extend outwardly from the primary plunger in the second direction.

18. The aircraft of claim 17, wherein a mechanical and rotatable coupling between a distal end of the secondary plunger rod and the first end of the second set of secondary plunger linkages is configured to move over a center line established between a middle of the secondary plunger in the first direction and a coupling of the second end of the second set of secondary plunger linkages to the secondary plunger thereby providing an over-center locking mechanism that locks the secondary plunger at an outermost extension in the second direction from the primary plunger within the opening of the modular container.

* * * * *